US007515626B2

(12) United States Patent
Lee et al.

(10) Patent No.: US 7,515,626 B2
(45) Date of Patent: Apr. 7, 2009

(54) LIGHT SOURCE CAPABLE OF LASING THAT IS WAVELENGTH LOCKED BY AN INJECTED LIGHT SIGNAL

(75) Inventors: Chang-Hee Lee, Taejon (KR); Wayne V. Sorin, Mountain View, CA (US)

(73) Assignee: Novera Optics, Inc., Santa Clara, CA (US)

( * ) Notice: Subject to any disclaimer, the term of this patent is extended or adjusted under 35 U.S.C. 154(b) by 4 days.

(21) Appl. No.: 10/558,820

(22) PCT Filed: May 29, 2003

(86) PCT No.: PCT/US03/17201

§ 371 (c)(1),
(2), (4) Date: Oct. 30, 2006

(87) PCT Pub. No.: WO2004/107628

PCT Pub. Date: Dec. 9, 2004

(65) Prior Publication Data

US 2007/0165688 A1    Jul. 19, 2007

(51) Int. Cl.
*H01S 3/092* (2006.01)
(52) U.S. Cl. .............................. 372/71; 372/81; 372/92
(58) Field of Classification Search ................. 372/71, 372/81, 92
See application file for complete search history.

(56) References Cited

U.S. PATENT DOCUMENTS 4,563,087 A    1/1986   Bourbin et al.

(Continued)

FOREIGN PATENT DOCUMENTS

EP    0607 029 A2    7/1994

(Continued)

OTHER PUBLICATIONS

Feldman, Robert D., et al.,"An Evaluation of Architectures Incorporating Wavelength Division Multiplexing for Broad-Band Fiber Access," Journal of Lightwave Technologies, vol. 16, No. 9, pp. 1546-1559. Sep. 1998.

(Continued)

*Primary Examiner*—Dung T Nguyen
(74) *Attorney, Agent, or Firm*—Blakely, Sokoloff, Taylor & Zafman LLP

(57) ABSTRACT

Various methods, systems, and apparatuses are described in which a light source (101) capable of lasing is wavelength locked by an injected light signal. The light source (101) capable of lasing, such as a Fabry-Perot laser diode, may have antireflective coating on one or more facets of the light source (101) capable of lasing. The light source (101) capable of lasing receives a spectral slice of a light signal from a broadband light source (113) to wavelength lock the output wavelength of the light source (101) capable of lasing within the bandwidth of the injected light signal. A current pump (141) may bias the light source (101) capable of lasing to operate as a reflective regenerate semiconductor optical amplifier so that the injected light is reflected back out a front facet after being amplified and wavelength locked. The current pump (141) may also bias the light source (101) capable of lasing such that the externally injected narrow-band light signal into the light source (101) capable of lasing suppresses the lasing modes outside of the bandwidth of injected incoherent light.

51 Claims, 5 Drawing Sheets

U.S. PATENT DOCUMENTS

| | | | |
|---|---|---|---|
| 5,117,303 | A | 5/1992 | Desurvire et al. |
| 5,202,780 | A | 4/1993 | Fussganger |
| 5,221,983 | A | 6/1993 | Wagner |
| 5,251,001 | A | 10/1993 | Dave et al. |
| 5,276,543 | A | 1/1994 | Olshansky |
| 5,307,366 | A | 4/1994 | Auffret et al. |
| 5,321,541 | A | 6/1994 | Cohen |
| 5,434,662 | A | 7/1995 | Rockwell et al. |
| 5,436,760 | A | 7/1995 | Nakabayashi |
| 5,440,417 | A | 8/1995 | Chung et al. |
| 5,550,666 | A | 8/1996 | Zirngibl |
| 5,661,585 | A | 8/1997 | Feldman et al. |
| 5,694,234 | A | 12/1997 | Darcie et al. |
| 5,793,512 | A | 8/1998 | Ryu |
| 5,880,865 | A | 3/1999 | Lu et al. |
| 5,894,247 | A | 4/1999 | Yoshida et al. |
| 5,907,417 | A | 5/1999 | Darcie et al. |
| 5,920,414 | A | 7/1999 | Miyachi et al. |
| 6,097,523 | A | 8/2000 | Boot |
| 6,117,699 | A | 9/2000 | Lemoff et al. |
| 6,137,611 | A | 10/2000 | Boivin et al. |
| 6,178,001 | B1 | 1/2001 | Kim |
| 6,304,350 | B1 | 10/2001 | Doerr et al. |
| 6,307,668 | B1 | 10/2001 | Bastien et al. |
| 6,323,994 | B1 | 11/2001 | Li et al. |
| 6,437,907 | B1 | 8/2002 | Yoon et al. |
| 6,650,840 | B2 | 11/2003 | Feldman |
| 6,654,401 | B2 | 11/2003 | Vieira et al. |
| 6,868,200 | B2 | 3/2005 | Kimotsuki et al. |
| 7,106,974 | B2 | 9/2006 | Lee et al. |
| 7,327,957 | B2 | 2/2008 | Lee et al. |
| 7,349,631 | B2 | 3/2008 | Lee et al. |
| 2001/0004290 | A1 | 6/2001 | Lee et al. |
| 2001/0013962 | A1 | 8/2001 | Li |
| 2001/0046364 | A1 | 11/2001 | Hiromi et al. |
| 2001/0048111 | A1 | 12/2001 | Mukaihara et al. |
| 2001/0048702 | A1 | 12/2001 | Yoshida et al. |
| 2002/0068859 | A1 | 6/2002 | Knopp |
| 2003/0076560 | A1 | 4/2003 | Pratt et al. |
| 2003/0095736 | A1 | 5/2003 | Kish, Jr. et al. |
| 2004/0184805 | A1 | 9/2004 | Shin et al. |
| 2004/0234265 | A1 | 11/2004 | Shin et al. |
| 2006/0045542 | A1* | 3/2006 | Lee et al. .................. 398/195 |

FOREIGN PATENT DOCUMENTS

| | | |
|---|---|---|
| EP | 0688 114 A1 | 12/1995 |
| EP | 0844706 A2 | 5/1998 |
| EP | 0844706 A3 | 5/1998 |
| EP | 0991 217 A2 | 4/2000 |
| EP | 1024 541 A | 8/2000 |
| EP | 1089 098 A1 | 4/2001 |
| GB | 2122371 A | 11/1984 |
| JP | 61-46084 | 3/1986 |
| JP | 6-67228 | 3/1994 |
| JP | 11-330631 | 11/1999 |
| JP | 2001-320133 | 11/2001 |
| JP | 2002-64244 | 2/2002 |
| JP | 2002-252414 | 9/2002 |
| JP | 2002-270949 | 9/2002 |
| JP | 2002-289964 | 10/2002 |
| JP | 2003-152272 | 5/2003 |
| KR | 1020010063062 | 7/2001 |
| KR | 10-2004-0025304 A | 3/2004 |
| WO | WO 97/49248 A1 | 12/1997 |
| WO | WO 98/45974 | 10/1998 |
| WO | WO 2004/028047 | 4/2004 |
| WO | WO 2004/034621 A2 | 4/2004 |

OTHER PUBLICATIONS

Healey, P., et al. "Spectral Slicing WDM-PON Using Wavelength-Seeded Reflective SOAs", pp. 1181-1182 (Abstract only submitted herewith), Electronics Letters, published Sep. 13, 2001, vol. 37, Issue 19. ISSN: 0013-5194.

Jung, D.K., et al., "Wavelength-Division-Multiplexed Passive Optical Network Based on Spectrum-Slicing Techniques", Copyright 1998 IEEE, 1041-1135/98, IEEE Phototonics Technology Letters, vol. 10, No. 9, Sep. 1998. pp. 1334-1336.

Jung, D.K., et al., "Spectrum-Sliced Bidirectional WDM PON", Korea Advanced Institute of Science and Technology, Department of Electrical Engineering, 5 pages, Optical Fiber Communication Conference, 2000. vol. 2, Date: 2000, pp. 160-162 plus cover and biblio pages.

Kim, Hyun Deok, et al., "A Low-Cost WDM Source with an ASE Injected Fabry-Perot Semiconductor Laser", IEEE Photonics Technology Letters, vol. 12, No. 8, Aug. 2000. Copyright 2000 IEEE. 1041-1135/00. pp. 1067-1069.

Lee, J.S., et al., "Spectrum-Sliced Fiber Amplifier Light Source for Multichannel WDM Applications", Copyright 1993 IEEE, pp. 1458-1461, IEEE Photonics Technology Letters, vol. 5, No. 12, Dec. 1993.

Lee, Jae-Seung, "Signal-to-Noise Ratio Measurement of a 2.5 Gb/s Spectrum-Sliced Incoherent Light Channel", pp. 94-96, IEEE Photonics Technology Letters, vol. 9, No. 1, Jan. 1997. Copyright 1997 IEEE. 1041-1135/97.

Noise Characteristics of Solitary Laser Diodes, Section 7.3.2 Mode partition noise, pp. 163-166, no date provided.

Oh, Tae-Won, et al., "Broadband Light Source for Wavelength-Division Multiple Access Passive Optical Network," Dept. of Electrical Engineering, Korea Advanced Institute of Sci and Tech, and Novera Optics Korea, Inc., no date provided.

PCT Invitation to Pay Additional Fees for PCT Counterpart Application No. PCT/US03/12054 Containing Communication Relating to the Results of the Partial International Search, 6 pages. Feb. 11, 2004.

PCT Notification Concerning Transmittal of Copy of International Preliminary Report on Patentability (Chapter 1 of the Patent Cooperation Treaty) for PCT Counterpart Application No. PCT/IB2004/002187 Containing International Search Report, 4 pages. Oct. 25, 2007.

PCT Notification of Transmittal of International Search Report for PCT Counterpart Application No. PCT/US03/12054 Containing International Search Report, 9 pages. Mar. 31, 2004.

PCT Notification of Transmittal of the International Search Report and Written Opinion of the International Searching Authority or the Declaration for PCT Counterpart Application No. PCT/IB2004/002187 Containing International Search Report, 7 pages. Sep. 17, 2007.

PCT Written Opinion for PCT Counterpart Application No. PCT/US03/12054, 6 pages. May 2, 2005.

Sampson, D.D., et al., "100mW Spectrally-Uniform Broadband ASE Source for Spectrum-Sliced WDM Systems", Electronics Letters, IEE Stevenage, GB, vol. 30, No. 19, Sep. 15, 1994, pp. 1611-1612. XP006001052 ISSN: 0013-5194.

PCT Notification of Transmittal of The International Search Report and the Written Opinion of the International Searching Authority or The Declaration for PCT Counterpart Application No. PCT/US2003/17201 Containing International Search Report (Oct. 27, 2003).

Lin, Ching-Fuh, et al., "Broad-Bank Superluminescent Diodes Fabricated on a Substrate with Asymmetric Dual Quantum Wells," XP011048417, IEEE Photonics Technology Letters, vol. 8, No. 11, pp. 1456-1458 (Nov. 1, 1996).

Sonnenberg-Klein, B., et al., "Multimode Lasing at Room Temperature from InGaAs/GaAs Quantum Dot Lasers," XP008093958Semiconductor Lasers for Lightwave Communication Systems vol. 4533, Aug. 21, 22, 2001, pp. 1-8.

European Search Report for EP Counterpart Application No. EP 03734316.7-1237, 4 pgs. (Jul. 17, 2008), Document not provided.
Petermann, Klaus, "Laser Diode Modulation and Noise," Section 7: Noise Characteristics of Solitary Laser Diodes, Section 7.3.2 Mode Partition Noise, Published by Springer, 1988 ISBN 9027726728, 9789027726728, pp. 163-166.

Oh, Tae-Won, et al., "Broadband Light Source for Wavelength-Division Multiple Access Passive Optical Network," OptoElectronics and Communication conference, Shanghai, China, 2003, pp. 389-390.

* cited by examiner

LIGHT SOURCE CAPABLE OF LASING THAT IS WAVELENGTH LOCKED BY AN INJECTED LIGHT SIGNAL

CROSS-REFERENCE TO RELATED APPLICATION

This application is a National Phase application of, and claims priority to, International Application No. PCT/US2003/017201, filed May 29, 2003, entitled A LIGHT SOURCE CABLE OF LASING THAT IS WAVELENGTH LOCKED BY AN INJECTED LIGHT SIGNAL.

FIELD

Embodiments of this invention relate to wavelength-division-multiplexing passive-optical-networks. More particularly, an embodiment of this invention relates to a light source capable of lasing that is wavelength locked by an injected light signal.

BACKGROUND

Some wavelength-division-multiplexing-passive-optical-networks (WDM PONs) require precise wavelength alignment between the wavelengths of the signal from a transmitter in a central office to a device in a remote site distributing that signal to a subscriber. In a passive-optical-network, a remote node containing the signal-distributing device is typically located outdoors without any electrical power supply. The transmission band of wavelengths of the outdoor signal-distributing device can change according to the variation of the external temperature. Misalignment of the wavelength between the transmitted signal and the operating wavelength of the device distributing the signal introduces extra insertion loss in the signal.

A possible way to minimize the misalignment can be to use a narrow-linewidth distributed feedback laser diode (DFB LD) that essentially always falls within the shifting bandwidths of the multiplexers as an optical transmitter to satisfy the wavelength alignment condition. However, this arrangement may not be an economic solution because of the high price of each accurately stabilized DFB LD.

Some PONS also use optical transmitters with a high bit rate and an adequate amount of gain to support high bit rate. Some passive optical network may use a broadband light emitting diode (LED) as an optical transmitter. However, the modulation bandwidth of the LED can be narrow, thereby, making it difficult to send data at a high bit rate. Moreover, long-distance transmission in a passive optical network can be difficult with an LED due to the inherent weak power output from an LED.

Some attempts have been made to inject a signal into a laser. However, standard laser chip lengths of 300 microns or so may cause insufficient gain due to no overlap between the bandwidth of an injected signal and a cavity mode of the laser. Also, some standard lasers may not generate suitable gain to support adequate signal quality over a range of operating frequencies when taking in consideration manufacturing tolerances and temperature drift.

SUMMARY

Various methods, systems, and apparatuses are described in which a light source capable of lasing is wavelength locked by an injected light signal. The light source capable of lasing, such as a Fabry-Perot laser diode (FP LD), may have antireflective coating on one or more facets of the light source capable of lasing. The light source capable of lasing receives a spectral slice of a light signal from a broadband light source to wavelength lock the output wavelength of the light source capable of lasing within the bandwidth of the injected light signal. A current pump may bias the light source capable of lasing to operate as a reflective regenerative semiconductor optical amplifier so that the injected light is reflected back out a front facet after being amplified and wavelength locked. The current pump may also bias the light source capable of lasing such that the externally injected narrow-band light signal into the light source capable of lasing suppresses the lasing modes outside of the bandwidth of injected incoherent light.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DESCRIPTION

Various light sources capable of lasing are described. For an embodiment, a light source capable of lasing, such as a Fabry-Perot laser diode, has antireflective coating on one or more facets of the Fabry-Perot laser diode. The Fabry-Perot laser diode receives a spectral slice of a light signal from a broadband light source to wavelength lock the output wavelength of the Fabry-Perot laser diode within the bandwidth of the injected light signal. A current pump biases the Fabry-Perot laser diode to operate as a reflective regenerative semiconductor optical amplifier so that the injected light is reflected back out a front facet after being amplified. This regenerative amplifying process results in an effective wavelength locking of the Fabry-Perot laser diode to the injected spectral slice of the broadband light source. The current pump also biases the Fabry-Perot laser diode such that the externally injected narrow-band light signal into the Fabry-Perot laser diode suppresses the lasing modes outside of the bandwidth of injected incoherent light. Further, the bandwidth of the injected light signal and a length of the laser chip in the Fabry-Perot laser diode may be selected to usually cause wavelengths in the bandwidth of the injected light signal to overlap with one or more cavity modes of the Fabry-Perot laser diode. Also, the laser chip of the Fabry-Perot laser diode may have an enhanced gain-bandwidth value of greater than 40 nanometers to support wavelength locking over the system's effective operating range while maintaining a useable signal quality when the Fabry-Perot laser diode is modulated with the data stream.

Figure 1:
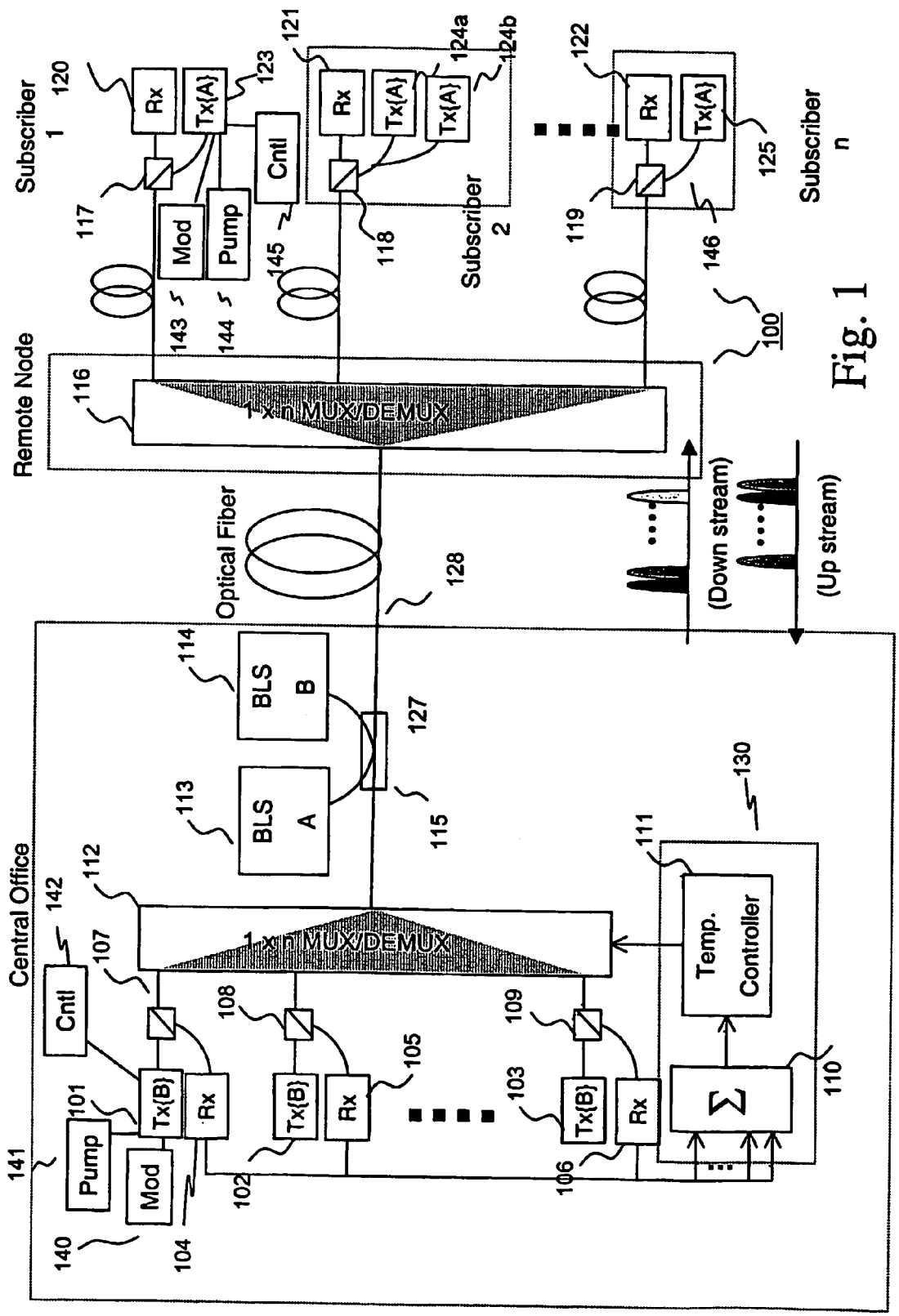
FIG. 1 illustrates a block diagram of an embodiment of a wavelength-division-multiplexing passive-optical-network using an optical transmitter wavelength locked by an injected light signal.

FIG. 1 illustrates a block diagram of an embodiment of a wavelength-division-multiplexing passive-optical-network using an optical transmitter wavelength locked by an injected light signal. The wavelength-division-multiplexing passive-optical-network 100 includes a first location such as a central office, a second location remote from the first location such as a remote node, and a plurality of subscriber locations.

The example central office contains a first group of optical transmitters 101-103 emitting optical signals in a first band of wavelengths, a first group of optical receivers 104-106 to accept an optical signal in a second band of wavelengths, a first group of band splitting filters 107-109, a wavelength-tracking component 130, a first 1×n bi-directional optical multiplexer/demultiplexer 112, an optical coupler 115, a first broadband light source 114, and a second broadband light source 113.

The first optical multiplexer/demultiplexer 112 spectrally slices a first band of wavelengths received from the first broadband light source 114 and demultiplexes a second band of wavelengths received from the second optical multiplexer/demultiplexer 116. A band splitting filter, such as the first broadband splitting filter 107, splits the first band of wavelengths and the second band of wavelengths signals to different ports. The first multiplexer/demultiplexer 112 couples to a first group of band splitting filters 107-109. Each optical transmitter in the first group of optical transmitters 101-103 receives a discrete spectrally sliced signal in the first band of wavelengths and aligns the operating wavelength of that optical transmitter to the wavelengths within bandwidth of the received spectrally sliced signal.

Each optical transmitter, such as a Fabry Perot laser diode, may cooperate with a current pump, such as the first current pump 141, and a modulator, such as the first modulator 140. The first current pump 141 biases the first optical transmitter 101 such that the externally injected narrow-band light signal into the first optical transmitter 101 suppresses the lasing modes outside of the bandwidth of injected incoherent light. The first modulator 140 directly modulates the output signal generated by the optical transmitter with a data stream.

A first controller 142 may also cooperate with the first optical transmitter 101 to provide an optimized gain for the injected light signal by shifting one or more cavity modes of the optical transmitter to overlap with the bandwidth of the injected light signal. The first controller may change the temperature of the first optical transmitter 101 or the current applied to the first optical transmitter 101 to shift the cavity modes of the optical transmitter 101. Alternatively, the bandwidth of the injected light signal and the size of the laser chip may be selected to approximately cause wavelengths in the bandwidth of the injected light signal to overlap with one or more cavity modes of the first optical transmitter 101 independent of an external device, such as the first controller 142, to shift the modes of the first optical transmitter 101.

The first optical transmitter 101 may have one or more facets with antireflective coating and a laser chip with two or more cavity modes. The first current pump 141 may bias first optical transmitter 101 to operate as a reflective regenerative semiconductor optical amplifier. A front facet of the first optical transmitter 101 receives the spectral slice light signal to wavelength lock the output wavelength of the first optical transmitter 101 within the bandwidth of the injected light signal. The first optical transmitter 101 reflects the injected light back out the front facet after being amplified, sideband suppressed, and wavelength locked. The first optical transmitter 101 transmits the modulated signal on a unique wavelength in the first band of wavelengths.

Each band splitting filter 107-109 couples to a given optical transmitter in the first group of optical transmitters 101-103 and a given optical receiver in the first group of optical receivers 104-106. Each optical receiver in the first group of optical receivers 104-106 receives a discrete demultiplexed signal in the second band of wavelengths.

The wavelength tracking component 130 includes an electrical or optical power summing device 110 and a temperature controller 111. The power summing device 110 measures the strength of an output signal of one or more of the optical receivers 104-106 to determine the difference in the transmission band of wavelengths between the first multiplexer/demultiplexer 112 and the second multiplexer/demultiplexer 116. The temperature controller 111 controls the operating temperature of the first optical multiplexer/demultiplexer 112 to maximize the strength of the measured output signal from the optical receivers 104-106. When the transmission band of wavelengths of the first multiplexer/demultiplexer 112 and the second multiplexer/demultiplexer 116 are matched, then the strength of the measured output signal from the optical receivers 104-106 is at its maximum. Thus, the multiplexed/demultiplexed transmission wavelength of the optical multiplexer/demultiplexers 112, 116 located in the central office and the remote node can be locked to each other.

The example remote node contains the second 1×n bi-directional optical multiplexer/demultiplexer 116. The second 1×n bi-directional optical multiplexer/demultiplexer 116 connects to the central office via a single optical fiber 128. The second 1×n optical multiplexer/demultiplexer 116 multiplexes and demultiplexes bi-directionally both the broadband optical signal containing the first band of wavelengths and the broadband optical signal containing the second band of wavelengths. The second 1×n optical multiplexer/demultiplexer 116 spectrally slices the second band of wavelengths from the second broadband light source 113.

Generally, multiplexing may be the combining of multiple channels of optical information into a single optical signal. Demultiplexing may be the disassembling of the single optical signal into multiple discrete signals containing a channel of optical information. Spectral slicing may be the dividing of a broad band of wavelengths into small periodic bands of wavelengths.

Each example subscriber location, for example, the first subscriber location, contains a band splitting filter 117, an optical transmitter 123 to emit optical signals in the second band of wavelengths, and an optical receiver 120 to receive optical signals in the first band of wavelengths. The second multiplexer/demultiplexer 116 to demultiplex the first band of wavelengths and spectrally slice the second band of wavelengths. The second multiplexer/demultiplexer sends these signals to each band splitting filter 117-119. The band splitting filters 117-119 function to split the input signal to an output port according to the input signal band. Each optical transmitter, such as the second optical transmitter 123, receives the spectrally sliced signal in the second band of wavelengths and aligns its operating wavelength for that optical transmitter to the wavelengths within the spectrally sliced signal. Each subscriber communicates with central office with a different spectral slice within the second band of wavelengths.

Similar to the central office, each optical transmitter may cooperate with a modulator, a current pump and a controller. For example, a second current pump 144 may bias the second optical transmitter 123 such that the externally injected narrow-band light signal into the second optical transmitter 123 suppresses the lasing modes outside of the bandwidth of injected incoherent light. The second modulator 143 directly modulates the output signal generated by the second optical transmitter 123 with a data stream. A second controller 145 may also cooperate with the second optical transmitter to provide an optimized gain for the injected light signal by changing the temperature of the second optical transmitter or the current applied to the second optical transmitter to shift one or more cavity modes of the optical transmitter to overlap with the bandwidth of the injected light signal.

The second optical transmitter 123 may have one or more facets with antireflective coating and a laser chip with two or more cavity modes. The bandwidth of the injected light signal and the size of the laser chip may be matched to approximately cause wavelengths in the bandwidth of the injected light signal to overlap with one or more cavity modes of the second optical transmitter independent of an external device, such as the second controller 145, to shift the modes of the second optical transmitter. Thus, the bandwidth of the injected signal either encompasses at least one cavity mode of the optical transmitter or falls in between two cavity modes but the wavelengths at both ends of the inject light signal band are so close to the FP LD's respective cavity modes that the reflected output wavelengths at both ends of the band are at least 3 dB greater in signal strength then the other Fabry-Perot modes of the laser.

Also, the optical fiber, such as the first optical fiber 146, coupling to the input facet of an optical transmitter may be aligned with the optical transmitter to achieve a coupling efficiency between 10% and 100%. Coupling efficiency may be measured as coupled measured power divided by the uncoupled measured power. The optical fiber may be a single mode optical fiber coupled to the front facet of the optical transmitter. The power of the output wavelength of the optical transmitter coupled back into the single mode optical fiber can be between +3 dBm (optical power measured in decibels relative to 1 milliwatt) and −20 dBm.

The first broadband light source 114, such as an amplified-spontaneous-emission source, supplies, via the first multiplexer/demultiplexer 112, the first band of wavelengths of light to a given optical transmitter in the first group of optical transmitters 101-103 in order to wavelength lock the transmission band of wavelengths of that optical transmitter. Thus, the range of operating wavelengths for the group of transmitters 101-103 in the central office is matched to the operating wavelengths of the first multiplexer/demultiplexer 112 in the central office via the injection of these spectrally sliced signals into each of these transmitters in the first group of optical transmitters 101-103. The wavelength locking of the each optical transmitter to the particular spectral slice passed through the band splitting filter solves the large power loss on down-stream signals in the 1×n optical multiplexer/demultiplexer 112. In this way, the large power loss due to the misalignment between the wavelength of the signal from an optical transmitter 101-103 and the transmission band of wavelengths of the multiplexer/demultiplexer 112 at the central office is minimized.

Similarly, the second broadband light source 113 supplies the second band of wavelengths of light to a given optical transmitter 123-125 to wavelength lock then transmission band of wavelengths of that optical transmitter in the second group. Thus, the operating wavelengths of the second group of transmitters 123-125 in the subscriber's local is matched to the range of operating wavelengths for the second multiplexer/demultiplexer 116 via the injection of these spectrally sliced signal into each of these transmitters in the second group of optical transmitters. The wavelength locking of the each optical transmitter to the particular spectral slice passed through the band splitting filter solves the large power loss on up-stream signals in the 1×n optical multiplexer/demultiplexer 116 due to the wavelength detuning depending on the temperature variation in the device at the remote node. In this way, the large power loss due to the misalignment between the wavelength of the signal from an optical transmitter 123-125 and the transmission band of wavelengths of the multiplexer/demultiplexer 116 at the remote node is minimized. By using either athermal multiplexer/demultiplexers 112 and 116 or by temperature control of multiplexer/demultiplexer 112, the wavelength alignment between multiplexer/demultiplexer 112 and multiplexer/demultiplexer 116 can be achieved resulting in minimized transmission loss between the Central Office and the subscribers.

Figure 2:
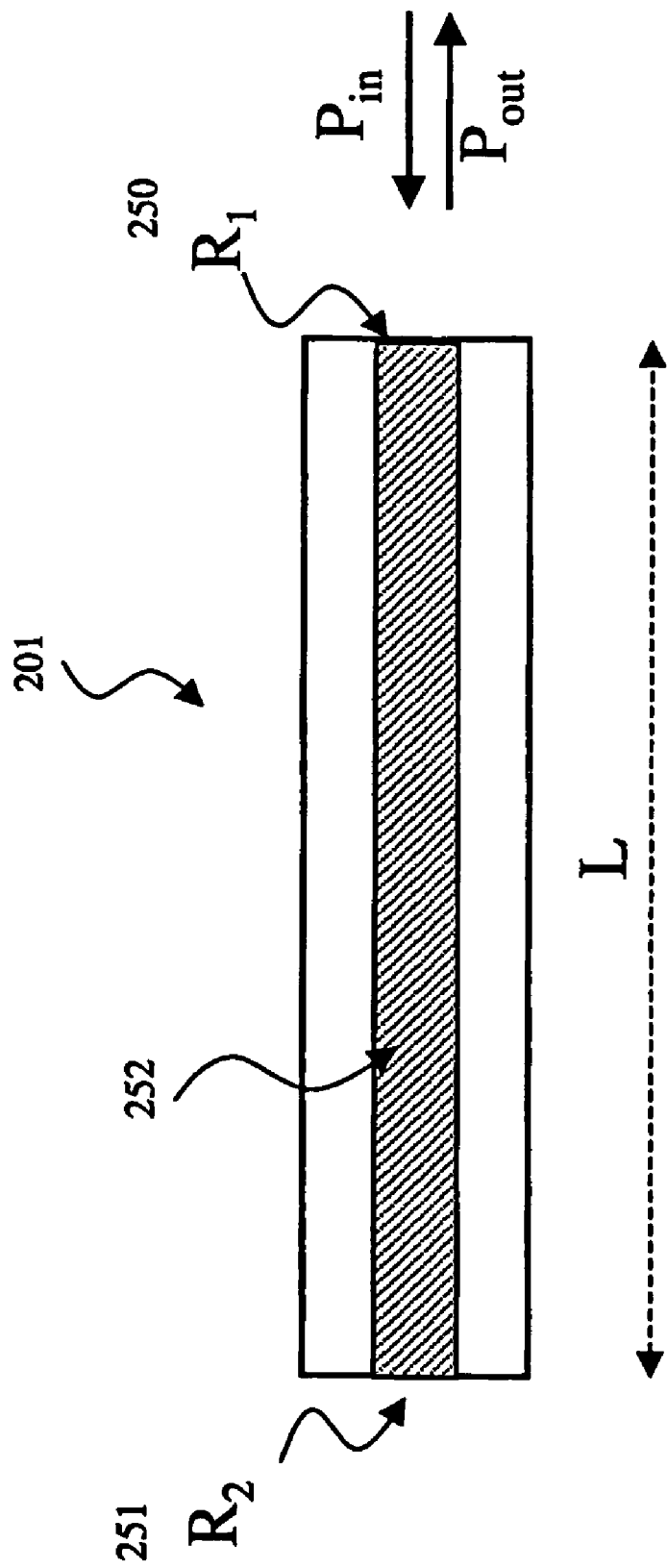
FIG. 2 illustrates a block diagram of an embodiment of a light source capable of lasing having one or more facets and a laser chip.

FIG. 2 illustrates a block diagram of an embodiment of a light source capable of lasing having one or more facets and a laser chip gain medium. An optical transmitter, such as a Fabry-Perot laser diode, may have antireflective coating on one or more facets 250, 251 of the Fabry-Perot laser diode 201. The antireflective coated Fabry-Perot laser diode 201 may obtain a better extinction ratio and thus a better bit rate error than a standard uncoated Fabry-Perot laser diode because of the lower reflectivity of the front facet 250. Further, the Fabry-Perot laser diode 201 may have a better side mode suppression ratio because the FP LD 201 has a lower insertion loss due to the input facet 250 having this antireflective coating. Thus, the injected light signal may have a lower magnitude and the gain of the FP LD 201 may be set lower, thereby, making an energy starved environment that does not amplify unwanted side modes of the Fabry-Perot laser diode 201.

The front facet 250 of the Fabry-Perot laser diode 201 can be anti-reflection coated to reduce the reflectivity. Optical reflectivity for the front facet 250 may have values that can range from 0.1% to 25%. The back facet 251 can be uncoated with a reflectivity of approximately 30%. Alternatively, the back facet 251 can be coated to obtain an optical reflectivity within the range from 10% to 100%.

The sizing of the laser chip 252 with relation to the bandwidth of the injected light signal helps to decrease the spacing of the cavity modes associated with the Fabry-Perot laser diode 201. This increases the probability that the wavelengths in the bandwidth of the injected light signal will overlap with one or more cavity modes of the Fabry-Perot laser diode 201. Increases in the chip length of the laser chip 252 may range between 450 microns and 1200 microns. Standard Fabry-Perot laser diode chip lengths are typically about 300 microns.

A gain region of the laser chip 252 may have one or more chirped quantum wells in the gain region, one or more strained quantum wells in the gain region, one or more quantum dots in the gain region, an increased doping beyond a standard doping in the gain region, or other similar enhancement to modify the FP LD to increase the gain-bandwidth of the Fabry-Perot laser diode 201. The enhanced gain-bandwidth supports a wider wavelength locking range for the FP LDs.

The Fabry-Perot laser diode 201 may be operated as a reflective regenerative semiconductor optical amplifier. The Fabry-Perot laser diode 201 may act as regenerative semiconductor amplifier amplifying an injected light signal even if the narrow band injected noise signal occurs between two cavity modes of the laser. As discussed, the bandwidth of the injected light signal and the size of the laser chip 252 may be matched to approximately cause wavelengths in the bandwidth of the injected light signal to overlap with one or more cavity modes of the FP LD 201. The wavelengths at both ends of the bandwidth of the injected light signal band are so close to the FP LD's respective cavity modes that the amplified wavelengths at both ends of the band are at least 3 dB greater in signal strength then the other side modes of the Fabry-Perot laser diode 201. Alternatively, a controller changes the operating temperature of the FP LD 201 or the current applied to the FP LD 201 to shift the cavity modes of the FP LD to overlap with the bandwidth of the injected light/noise signal to provide an optimized gain for the injected signal. The Fabry-Perot laser diode 201 generally reflects and amplifies the injected spectrally sliced noise signal.

Figure 3:
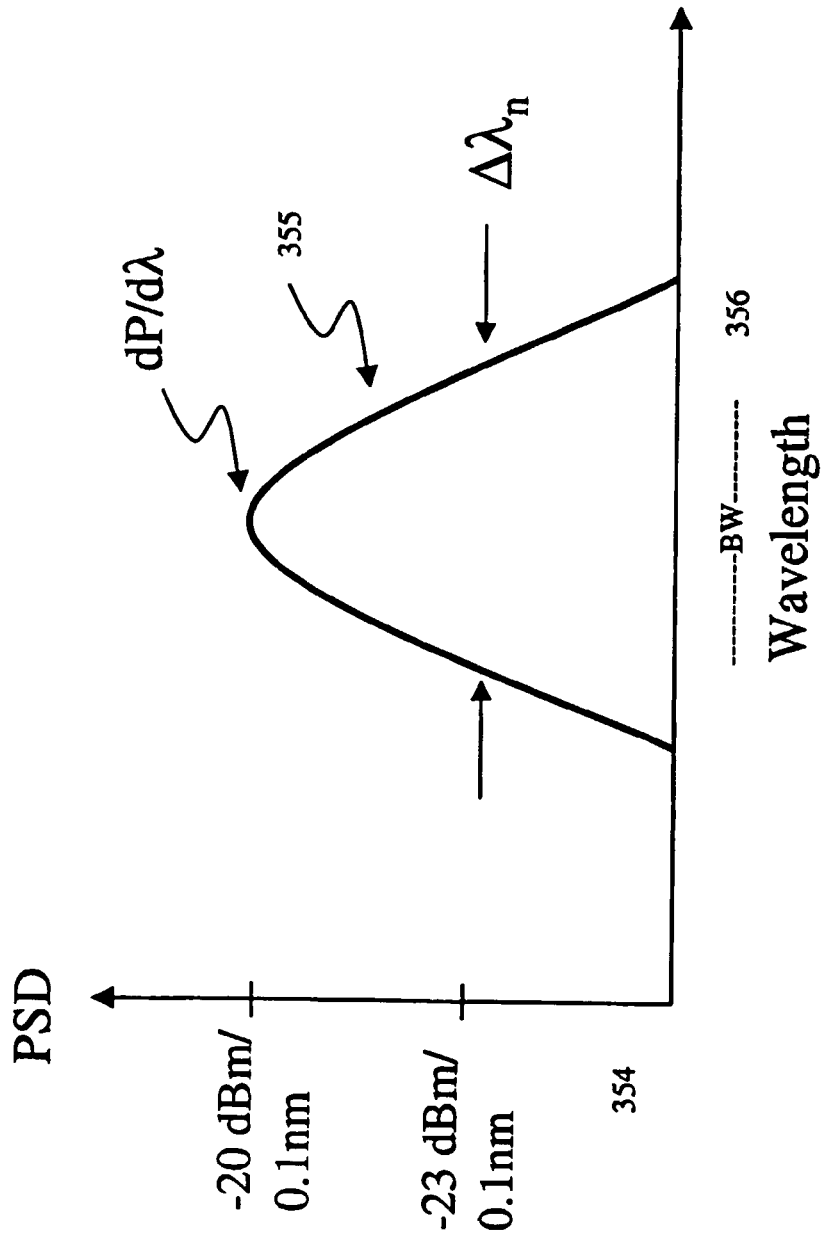
FIG. 3 illustrates a graph of input power spectral density of an injected light signal versus wavelength for an embodiment of the light source capable of lasing.

FIG. 3 illustrates a graph of input power spectral density of an injected light signal versus wavelength for an embodiment of the light source capable of lasing. The input power spectral density (power per wavelength band) 354 of the injected light signal 355 delivered to the front facet of the FP LD may have a power spectral density between −10 dBm/0.1 nm bandwidth to −30 dBm/0.1 nm bandwidth. The bandwidth of the spectral slice 356 may be taken as the spectral width at a value, for example, −3 dB lower than the peak. The bandwidth of the spectral slice 356 may be taken as the spectral width at values as low as −20 dB lower than peak. Due to the low power actually required from the injected light signal 355, the noise is reduce due to the saturation level of the laser and the quasi-lasing action to suppress sidebands.

The spectral bandwidth 356 of the narrow-band input injection signal 355 received on the input facet can vary from 5 GHz to 500 GHz. The Fabry-Perot laser diode, due to the antireflective coating on one or more facets, generates a side-mode suppression ratio having values between 3 dB to 35 dB. The side-mode suppression ratio may be the ratio of the optical output power of the modes within the injection bandwidth to the modes outside the injection bandwidth.

The broadband light source may generate a light signal having approximately equal polarization states. The input optical signal injected 355 into the laser diode is typically unpolarized so that a polarization state that matches that of the laser diode is present. The injected light signal 355 received on the input facet of the Fabry-Perot laser diode may have a polarization ratio between 0 dB and 3 dB. The polarization ratio refers to the maximum ratio of power between any two orthogonal input polarization states. Thus, a range for the polarization ratio of the injected power can be from 0 dB to 3 dB.

Figure 4:
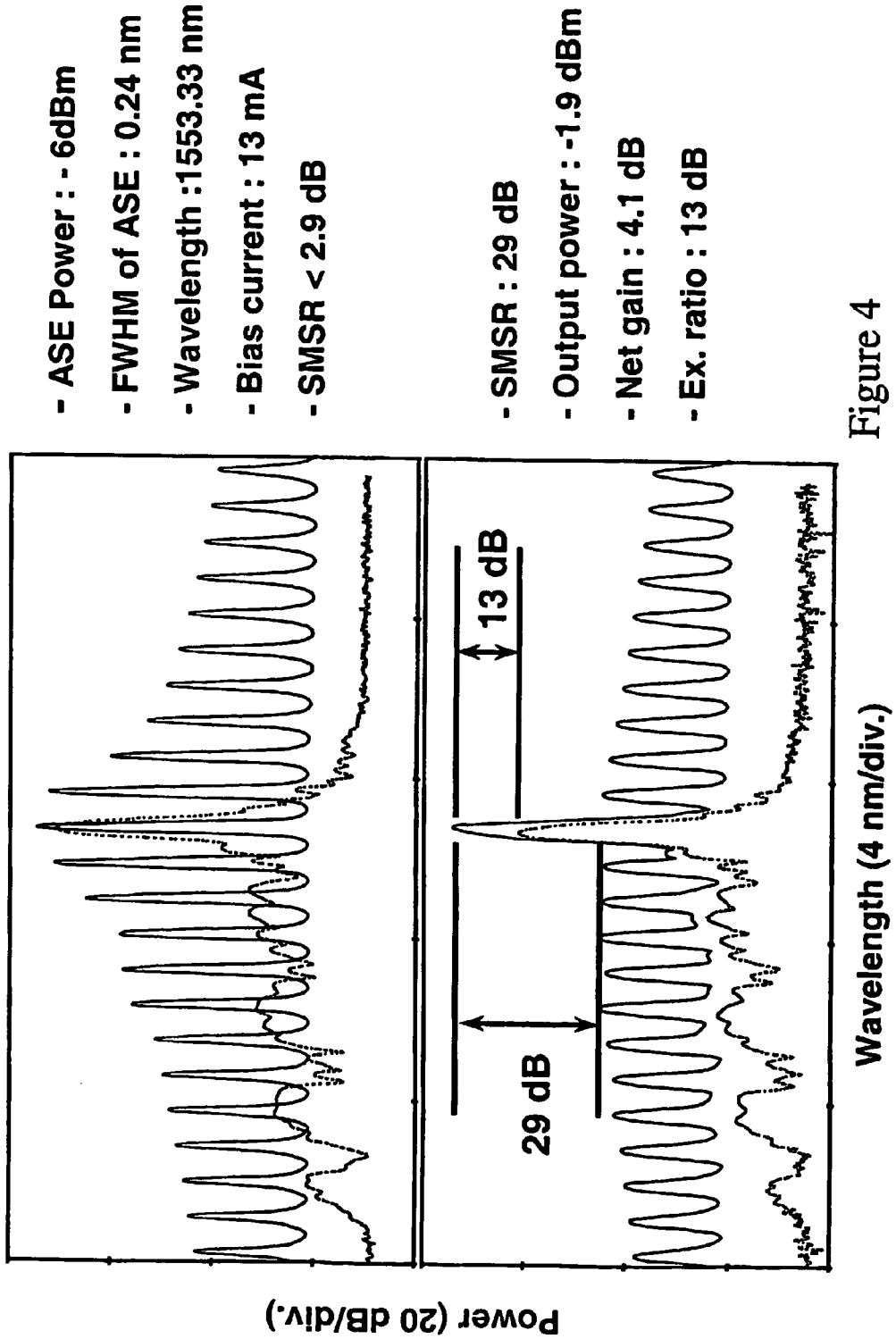
FIG. 4 illustrates a graph of power versus wavelength before the injected light signal and after the injected light signal for an embodiment of the light source capable of lasing.

FIG. 4 illustrates a graph of power versus wavelength before the injected light signal and after the injected light signal for an embodiment of the light source capable of lasing. For the upper curves, the solid line shows the output spectrum of the light source capable of lasing, when the bias current is above the lasing threshold current and without injection. The dotted lines in upper curves show the spectrum of the injected broadband light into the light source capable of lasing. For the lower curves, the solid line shows the output spectrum of the light source capable of lasing with an injection of the light signal. The dotted lines in lower curves show the output spectrum of the light source capable of lasing, when the bias current to the FP LD is turned off. It represents the reflected spectrum of injected broadband light. The current pump biases the Fabry-Perot laser diode to operate near or above a lasing threshold when no input signal is injected into the laser. The gain of the laser is suppressed to below that of the free-running laser when the light signal is injected into the laser. The operating pump current for the FPLD can range from 0.9 to 1.5 times the lasing threshold of the free running laser. By injecting an external narrowband signal into the Fabry-Perot laser diode and operating the pump current near its free-running laser threshold, a condition of maximum reflective gain can be achieved while suppressing the lasing of Fabry-Perot modes outside the injected wavelength band.

The Fabry-Perot modes outside of the bandwidth of the injected incoherent light incur a side mode suppression ratio between 3 dB and 35 dB. The addition of antireflective coating to a FP LD that has a fixed pump current increases the side mode suppression ratio of that FP LD.

A modulator may directly data modulate an output signal generated by the Fabry-Perot laser diode. The extinction ratio of the directly modulated signal may be greater than 5 dB. Data modulation rates may be in the ranges from 100 Mbps to 175 Mbps, 600 to 650 Mbps, and 1000 to 1500 Mbps (Megabits per second). The combination of amplification of the injected light signal along with the large suppression of sidebands and noise allows a high transfer bit rate in the WDM PON.

Figure 5:
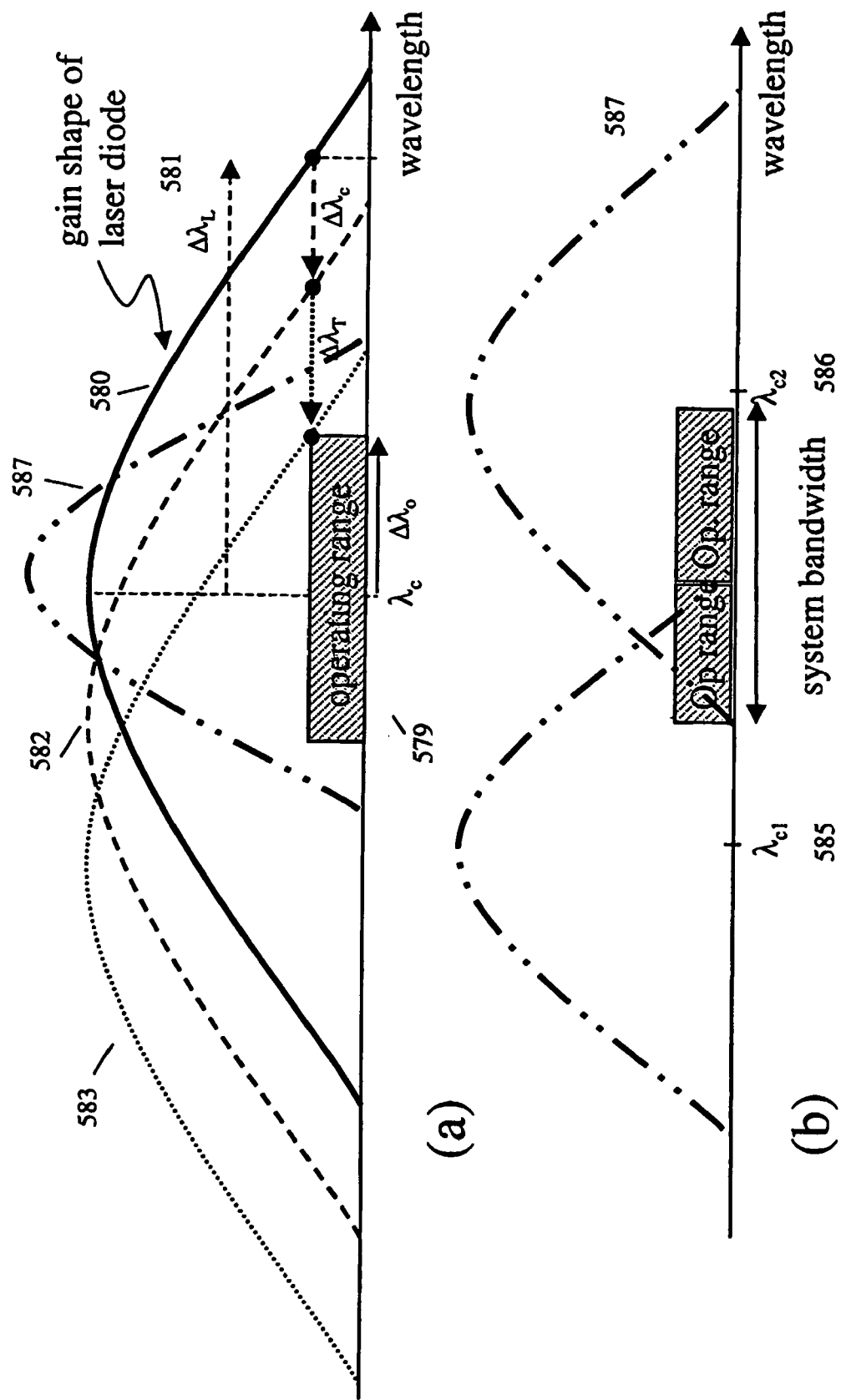
FIGS. 5a and 5b illustrate the gain shape versus wavelength of a light source capable of lasing, such as a FP LD, for an embodiment of the light source capable of lasing.

FIGS. 5a and 5b illustrate the gain shape of a light source capable of lasing, such as a FP LD, versus wavelength for an embodiment of the light source capable of lasing. Referring to FIG. 5a, the solid line represents the nominal gain curve 580 of a Fabry Perot laser diode and the rectangular box represents the effective practical operating range ($\Delta\lambda_o$) 579 over which adequate signal quality exists when the light source capable of lasing, such as a FP LD, is modulated with a data stream. The horizontal line represents wavelength locking range ($\Delta\lambda_L$) 581 over which adequate signal quality exists when the FP LD is modulated with a data stream. The dashed line illustrates a potential center wavelength shift in the gain curve of that FP LD which is possible due to manufacturing tolerances 582. The dotted line illustrates a potential center wavelength shift in the gain curve of that FP LD which is possible due to manufacturing tolerances plus a shift due temperature drift of the FP LD 583. The alternating dashed and dotted line illustrates a gain curve of a Fabry Perot laser diode having a laser chip with an unmodified gain region 587.

When an input incoherent signal is injected into the FP LD there exists a wavelength locking range ($\Delta\lambda_L$) 581 over which adequate signal quality exists when the FP LD is modulated with a data stream. For standard FP LDs, the wavelength locking range may be about ($\Delta\lambda_L$)=±15 nanometers (nm). For a typical WDM-PON system configuration using 32 channels spaced at 0.8 nm, the required system bandwidth that the FP LDs need to be wavelength-locked over is about ±13 nm. However, a standard FP LD may not be able to adequately cover the required system bandwidth by itself. In a WDM PON system, the center wavelength for a FP LD may vary due to both temperature and manufacturing tolerances.

The effective practical operating range 581 of the FP LDs will be reduced if the FP LD are not centered in the middle of this system bandwidth either due to temperature changes or manufacturing tolerances. The following expression describing this relationship between the various parameters and is illustrated by referring to FIG. 5a.

$$\Delta\lambda_L = \Delta\lambda_o + \Delta\lambda_c + \Delta\lambda_T$$

Where $\Delta\lambda_L$ is the required locking range of the FP laser diode, $\Delta\lambda_o$ is the effective operating range of the FPLD after taking into account variations in temperature and manufacturing tolerances, $\Delta\lambda_c$ is the variation in the center of the gain curve due to manufacturing tolerances, and $\Delta\lambda_T$ is the offset of the gain curve due to temperature changes of the FP LD.

For example, consider a controlled operating temperature range of ±10 C., a manufacturing tolerance of $\Delta\lambda_c$=±5 nm and a required system bandwidth (effective operating range) of $\Delta\lambda_o$=±13 nm. The ±10 C. temperature range corresponds to a center wavelength variation of $\alpha\lambda_T$=±5 nm because a typical tuning coefficient for the gain curve of a FP LD may be 0.5 nm/C. The required locking range for this example laser diode becomes $\Delta\lambda_L=\pm23$ nm ($\pm13$ nm, $\pm5$ nm, $\pm5$ nm). This presents a problem since a standard FP LD has a locking range of roughly $\pm15$ nm. This problem can increase if the WDM PON uses an uncontrolled temperature range of $\pm25$ C. and a standard manufacturing tolerance of $\pm10$ nm. The required locking range would now becomes $\Delta\lambda_L=\pm35.5$ nm to support a useable signal quality when the Fabry-Perot laser diode is modulated with the data stream.

The WDM PON may solve this problem in a number of ways.

One solution may be the use of FP LDs with larger wavelength locking ranges, via a wider nominal gain curve 580, than that of the standard values to anticipate the effects of temperature drift and manufacturing tolerances in the center of the gain spectrum. The FP LD may use a non-standard laser chip whose gain-bandwidth is larger than that of the standard values of about $\pm15$ nm. These types of laser diodes can be manufactured by modifying the gain region of the laser chip to generate a wider nominal gain curve 580. Some methods for increasing the gain-bandwidth of semiconductor lasers include, increasing the doping in the gain region, using chirped quantum well for the gain region, using strained quantum wells for the gain region or the use of quantum dots for the gain region, or another similar method.

The laser chip of the Fabry-Perot laser diode having an enhanced gain region may have a gain-bandwidth value of greater than 40 nanometers ($\pm20$ nm) to support wavelength locking over that bandwidth after being injected with the input incoherent signal while still supporting a useable signal quality when the Fabry-Perot laser diode is modulated with the data stream. A useable output signal generated by the FP LD has an acceptable bit error rate in the modulated operating range after being modulated.

Referring to FIG. 5b, another solution to increasing the wavelength locking operating is to use more than one type of laser diode. Each type of Fabry Perot laser diode having a laser chip with an unmodified gain region 587. Each type of FP LD being manufactured with a different offset center wavelength 585, 586. Lasers may be binned into specific wavelength regions so that two or more different lasers may be combined to be used for different parts of the channel plan.

Referring to FIG. 1, a plurality of light sources capable of lasing, such as the third optical transmitter 124a and the forth optical transmitter 124b, couple at the output ends of the second multiplexer/demultiplexer 116. The third optical transmitter 124a and the forth optical transmitter 124b emit an output signal at an approximately same wavelength and each output signal is locked by the injected spectrally-sliced narrow-band light signal. The third optical transmitter 124a may have a laser chip with a first center wavelength. The forth optical transmitter 124b may have a second laser chip with a second center wavelength. The second center wavelength is offset from the first center wavelength. The bandwidth of the wavelength locking range of the first light source capable of lasing and the bandwidth of the wavelength locking range of the second light source capable of lasing combine to be equal or greater than the sum of the operating range of the system bandwidth, the variation in the center wavelength due manufacturing tolerances, and an offset in a gain curve due to temperature changes.

Also, the optical transmitters in the subscribers may be binned into two or more groups so that two or more different lasers may be combined to cover the overall system bandwidth. The first group has laser chips with a first center wavelength and individually connect to a port in the top half of ports in the multiplexer/demultilplexer. For example, the second optical transmitter 123 may have a laser chip with a first center wavelength and connect to a first port in the top half of ports in the multiplexer/demultilplexer 116. The second group has laser chips with a second center wavelength and individually connect to a port in the bottom half of ports in the multiplexer/demultilplexer. For example, the fifth optical transmitter 125 may have a laser chip with a second center wavelength and individually connect to an Nth port in the bottom half of ports in the multiplexer/demultilplexer 116.

Referring to FIG. 5b, the use of multiple FP LDs having different center wavelengths 585, 586 allows the required system bandwidth to be divided into smaller regions or bins so that the required operating range for each laser is smaller. For example, if the required system bandwidth is $\pm13$ nm and we use two different laser types to cover this region, the required operating range for each laser would be only $\Delta\lambda_o=\pm6.5$ nm. By reducing the operating range for the different lasers, the necessary locking range $\Delta\lambda_L$ can be reduced. Although only two bins were used in the above example, larger numbers of bins can also be used. The maximum number of bins may equal the number of WDM channels used in the communication system. Combining the use of binning different types of FP LDs and laser chips with an enhanced gain-bandwidth may also be useful to solve trade-offs between technology limits and cost.

Referring to FIG. 1, the wavelength-division-multiplexing passive-optical-network 100 may use different wavelength bands in downstream signals, such as the first band of wavelengths, and up-stream signals, such as the second band of wavelengths. The down-stream signals may represent the signals from optical transmitters 101-103 in the central office to the subscribers and the up-stream signals may represent the signals from optical transmitters 123-125 in the subscribers to the central office. The wavelengths of the down-stream signals may be, for example, $\lambda1, \lambda2, \ldots \lambda n$ and the upstream signals would be $\lambda1^*, \lambda2^*, n^*$ but carried in a different band of wavelengths, where $\lambda1$ and $\lambda1^*$ are separated by the free spectral range of the multiplexer/demultiplexer.

As discussed, the 1×n optical multiplexer/demultiplexer 116 has the function that an optical signal from a port in the left side is demultiplexed to the n number of ports in the right side. Further, the optical signals from the n-ports in the right side are multiplexed to a port in the left side simultaneously. The 1×n optical multiplexer/demultiplexer 116 spectrally splices the second band of wavelengths into narrow spectral widths of wavelengths. Because the optical multiplexer/demultiplexer can be operated on more than two bands of wavelengths, the bi-directionally propagated up-stream signals and down-stream signals in different bands can be multiplexed and demultiplexed at the same time. Each of the bands of wavelengths operated on by the optical multiplexer/demultiplexer may be offset by one or more intervals of the free spectral range of the optical multiplexer/demultiplexer.

For an embodiment, the upstream band of wavelengths may be in the wavelength range from 1520 nm to 1620 nm. This is due to the higher power ASE sources available in this wavelength range, an example being the erbium doped fiber amplifier. The downstream band of wavelengths may be in the bandwidth range of 1250 nm to 1520 nm. For a narrow band application, the upstream and downstream wavelength ranges may be in 1525~1565 nm and 1570~1610 nm, respectively. Alternatively, the second band of wavelengths may be a band of wavelengths having a spectral separation of between 5-100 nanometers apart from a peak wavelength of the first band of wavelengths. The spectral separation between the first band of wavelengths and the second band of wavelengths should be great enough to prevent the occurrence of interference between the filtered spectrally sliced downstream signal to a subscriber and the filtered upstream signal from that subscriber.

Note, the specific numeric reference should not be interpreted as a literal sequential order but rather interpreted that the first band of wavelength is different than a second band of wavelengths. Thus, the specific details set forth are merely exemplary. Some additional embodiments may include the following. A single device may provide the function of both the first broadband light source and the second broadband light source. The WDM PON may use more than two different bands of wavelengths. Each multiplexer/demultiplexer may be an athermal arrayed waveguide grating. Each multiplexer/demultiplexer may merely divide an input light signal rather than spectrally slice the input light signal. More than one remote node may exist. An optical transmitter may be operated continuous wave and modulated by an external modulator, etc. The receiver input power may vary from −27 dBm to −36 dBm for 100 Mb/s to approximately 170 Mb/s. The fiber length between the Central Office and the Remote Node can be up to 20 kilometers. The fiber length between the Remote Node and Subscribers can be up to 15 kilometers. Each optical transmitter may be directly modulated by, for example, electrical current modulation to embed information onto the specific wavelength transmitted by that optical transmitter. Each optical transmitter includes a light source capable of lasing. One or more of the optical transmitters may be a Fabry-Perot semiconductor laser that are injected with the spectrum-sliced broadband incoherent light from an amplified-spontaneous-emission light source. One or more of the optical transmitters may be a wavelength-seeded reflective semiconductor optical amplifier (SOA). One or more of the optical transmitters support high bit-rate modulation and long-distance transmission. A reflective SOA may also as act as the modulation device. The optical transmitters may be modulated, wavelength locked using wavelength seeding, provide signal gain for the wavelengths within the spectral slice and increase the extinction ratio between the injected wavelengths and wavelengths outside the spectral slice. The broadband light source may be a light source based on semiconductor optical amplifiers, a light source based on rare-earth ion-doped optical fiber amplifiers, a light emitting diode, or similar device. The broadband light source may provide light with any kind of characteristic such as coherent or incoherent light.

The optical multiplexer/demultiplexer can be achieved by an arrayed waveguide grating including an integrated waveguide grating, a device using thin-film filters, a diffraction grating, or similar device. The optical multiplexer/demultiplexer can also be a dielectric interference filter or similar device. The multiplexer/demultiplexer may have wavelength spacing between individual wavelength channels between 25 gigahertz and 400 gigahertz. The use of temperature control of the laser diodes limits the wavelength drift of the lasers. Small heaters near the laser may be used to control their temperature between 40 degrees centigrade to 50 degrees centigrade. This limits the wavelength drift and reduces the required locking range for the laser diodes. Other values for the temperature ranges can also be used.

The optical-passive-network may consist of non-power supplied passive optical devices without any active devices between the central office and optical subscribers. The topology structure of the optical distribution network may be a star topology that has the remote node with an optical multiplexer/demultiplexer placed near the subscribers, and plays a role to relay communications with the central office through a single optical fiber and to distribute signals to and from each of the subscribers through their own optical fiber. The second multiplexer/demultiplexer may be in a remote location such that the ambient conditions differ enough from the environment of the first multiplexer/demultiplexer to substantially alter the transmission band of wavelengths of the second multiplexer/demultiplexer when matched to the transmission band of wavelengths of the first multiplexer/demultiplexer.

In the forgoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather then a restrictive sense.

We claim:

1. An apparatus, comprising:
a light source capable of lasing having antireflective coating on one or more facets of the light source capable of lasing, wherein the light source capable of lasing to receive a spectral slice of a light signal from a broadband light source to effectively wavelength lock an output wavelength of the light source capable of lasing within the bandwidth of the injected light signal; and
a current pump to bias the light source capable of lasing such that the injected light signal into the light source capable of lasing suppresses lasing modes outside of the bandwidth of the injected light signal, wherein the light source capable of lasing has a size that is selected such that wavelengths of the injected light signal overlap with one or more cavity modes of the light source capable of lasting.

2. The apparatus of claim 1, wherein the light source capable of lasing is a Fabry-Perot laser diode.

3. The apparatus of claim 2, further comprising the Fabry-Perot laser diode having a laser chip with two or more cavity modes, wherein the bandwidth of the injected light signal and a size of the laser chip are matched to cause wavelengths in the bandwidth of the injected light signal to overlap with one or more cavity modes of the Fabry-Perot laser diode.

4. The apparatus of claim 3, wherein the size of the laser chip has a chip length of greater than 450 microns.

5. The apparatus of claim 2, wherein an optical reflectivity for a front facet may have values that can range from 0.1% to 25%.

6. The apparatus of claim 2, wherein an optical reflectivity for a back facet may have values that can range from 10% to 100%.

7. The apparatus of claim 2, wherein the current pump to bias the Fabry-Perot laser diode to operate as a reflective regenerative semiconductor optical amplifier.

8. The apparatus of claim 2, wherein the Fabry-Perot laser diode having antireflective coating on one or more facets to generate a side-mode suppression ratio having values greater than 3 dB.

9. The apparatus of claim 2, further comprising: a controller to provide an optimized gain for the injected light signal by changing the temperature of the Fabry-Perot laser diode to shift one or more cavity modes of the Fabry-Perot laser diode to overlap with the bandwidth of the injected light signal.

10. The apparatus of claim 2, further comprising: a controller to provide an optimized gain for the injected light signal by changing the current applied to the Fabry-Perot laser diode to shift one or more cavity modes of the Fabry-Perot laser diode to overlap with the bandwidth of the injected light signal.

11. The apparatus of claim 1, wherein the apparatus is part of a passive optical network, further comprising: a broadband light source to supply an optical signal containing a first band of wavelengths to a multiplexer/demultiplexer, wherein the Fabry-Perot laser diode to couple to a port of the multiplexer/demultiplexer to receive the spectral slice of the light signal from the broadband light source.

12. The apparatus of claim 11, wherein the multiplexer/demultiplexer to have wavelength spacing between individual wavelength channels between 25 gigahertz and 400 gigahertz.

13. The apparatus of claim 2, further comprising: a modulator to data modulate an output signal generated by the Fabry-Perot laser diode with a data stream, wherein the laser chip of the Fabry-Perot laser diode has a gain-bandwidth value of greater than 40 nanometers to support effective wavelength locking over that bandwidth after being injected with the input light signal while still supporting a useable signal quality when the Fabry-Perot laser diode is modulated with the data stream.

14. The apparatus of claim 2, wherein a gain region of the laser chip has one or more chirped quantum wells in the gain region of the laser chip.

15. The apparatus of claim 2, wherein a gain region of the laser chip has one or more strained quantum wells in the gain region of the laser chip.

16. The apparatus of claim 2, wherein a gain region of the laser chip has one or more quantum dots in the gain region of the laser chip.

17. The apparatus of claim 2, wherein a gain region of the laser chip is modified for increasing the gain-bandwidth of the Fabry-Perot laser diode by an increased doping beyond a standard doping in the gain region of the laser chip.

18. The apparatus of claim 2, wherein the pump to supply a bias pump current to the Fabry-Perot laser diode having a value that is between 0.9 to 1.5 times a lasing threshold current that occurs when no input light signal is injected into the laser.

19. The apparatus of claim 2, further comprising: a modulator to directly data modulate an output signal generated by the Fabry-Perot laser diode, wherein an extinction ratio of the directly modulated signal is greater than 5 dB.

20. The apparatus of claim 2, further comprising: an optical fiber coupled to an input facet of the Fabry-Perot laser diode and aligned with the input facet to achieve a coupling efficiency of greater than 20%.

21. The apparatus of claim 2, further comprising: an input facet of the Fabry-Perot laser diode; wherein the injected light signal received on the input facet to have a power spectral density between minus 10 dBm/0.1 nm bandwidth to minus 30 dBm/0.1 nm bandwidth.

22. The apparatus of claim 2, further comprising: a single mode optical fiber coupled to a first facet of the Fabry-Perot laser diode, wherein the power of the output wavelength of the Fabry-Perot laser diode coupled back into the single mode optical fiber can be between +3 dBm and −20 dBm.

23. The apparatus of claim 2, further comprising: an input facet of the Fabry-Perot laser diode, wherein the injected light signal received on the input facet to have a polarization ratio between 0 dB and 3 dB.

24. The apparatus of claim 2, further comprising: an input facet of the Fabry-Perot laser diode, wherein the bandwidth of the injected light signal received on the input facet is to be less than 500 gigahertz.

25. The apparatus of claim 2, wherein the current pump to bias the Fabry-Perot laser diode to operate above a lasing threshold when no input light signal is injected into the laser and to suppress the gain of the laser to below that of the free-running Fabry-Perot laser diode when the light signal is injected into the Fabry-Perot laser diode.

26. An apparatus, comprising:
a light source capable of lasing having one or more facets and a laser chip with two or more cavity modes, wherein a first facet of the light source capable of lasing to receive a spectral slice of a light signal from a broadband light source to effectively wavelength lock the output wavelength of the light source capable of lasing within the bandwidth of the injected light signal and the injected light signal is reflected back out the first facet after being amplified and effectively wavelength locked; and
a current pump to bias the light source capable of lasing to operate as a reflective regenerative semiconductor optical amplifier, wherein the bandwidth of the injected light signal and a size of the laser chip are matched to cause wavelengths in the bandwidth of the injected light signal to overlap with one or more cavity modes of the light source capable of lasing independent of an external device effecting the light source capable of lasing shifting the mode of the light source capable of lasing.

27. The apparatus of claim 26, wherein the light source capable of lasing is a Fabry-Perot laser diode.

28. The apparatus of claim 27, further comprising: a single mode optical fiber coupled to a first facet of the Fabry-Perot laser diode, wherein the power of the output wavelength of the Fabry-Perot laser diode coupled back into the single mode optical fiber can be between +3 dBm and −20 dBm.

29. The apparatus of claim 27, wherein the current pump to bias the Fabry-Perot laser diode to operate above a lasing threshold when no input light signal is injected into the laser and to suppress the gain of the laser to below that of the free-running Fabry-Perot laser diode when the light signal is injected into the Fabry-Perot laser diode.

30. The apparatus of claim 27, wherein the pump to supply a bias pump current to the Fabry-Perot laser diode having a value that is between 0.9 to 1.5 times a lasing threshold current that occurs when no input light signal is injected into the laser.

31. The apparatus of claim 27, further comprising: a modulator to directly data modulate an output signal generated by the Fabry-Perot laser diode, wherein an extinction ratio of the directly modulated signal is greater than 5 dB.

32. The apparatus of claim 27, further comprising: a modulator to directly data modulate the Fabry-Perot laser diode with a data stream; wherein the laser chip of the Fabry-Perot laser diode has a gain-bandwidth value of greater than 40 nanometers to support effective wavelength locking over that bandwidth after being injected with the input light signal while supporting useable signal quality when the Fabry-Perot laser diode is modulated with the data stream.

33. The apparatus of claim 27, wherein at least one of the facets has antireflective coating.

34. The apparatus of claim 27, wherein the apparatus is part of a passive optical network, further comprising: a broadband light source to supply an optical signal containing a first band of wavelengths to a multiplexer/demultiplexer, wherein the FP LD to couple to a port of the multiplexer/demultiplexer to receive the spectral slice of the light signal from the broadband light source.

35. The apparatus of claim 27, wherein a gain region of the laser chip has one or more chirped quantum wells in the gain region of the laser chip.

36. The apparatus of claim 27, wherein a gain region of the laser chip has one or more strained quantum wells in the gain region of the laser chip.

37. The apparatus of claim 27, wherein a gain region of the laser chip has one or more quantum dots in the gain region of the laser chip.

38. The apparatus of claim 27, wherein a gain region of the laser chip is modified for increasing the gain-bandwidth of the Fabry-Perot laser diode by an increased doping beyond a standard doping in the gain region of the laser chip.

39. The apparatus of claim 27, wherein the pump current to bias the Fabry-Perot laser diode generates a side-mode suppression ratio having values greater than 3 dB for Fabry-Perot modes outside the bandwidth of the injected light signal.

40. The apparatus of claim 27, wherein the size of the laser chip has a chip length of greater than 450 microns.

41. The apparatus of claim 27, further comprising: an input facet of the Fabry-Perot laser diode, wherein the injected light signal received on the input facet to have a polarization ratio between 0 dB and 3 dB.

42. The apparatus of claim 27, further comprising: an input facet of the Fabry-Perot laser diode, wherein the bandwidth of the injected narrow-band light signal received on the input facet is to be less than 500 gigahertz.

43. The apparatus of claim 27, further comprising: an input facet of the Fabry-Perot laser diode, wherein the injected narrow-band light signal received on the input facet to have a power spectral density between −10 dBm/0.1 nm bandwidth to −30 dBm/0.1 nm bandwidth.

44. A multi-channel passive optical network wavelength division multiplexing system, comprising:
   a broadband light source that generates a broadband light signal; a demultiplexer that slices spectrally the broadband light signal to produce a plurality of narrow-band light signals;
   a first light source capable of lasing to couple at a first output end of the demultiplexer, wherein the first light source capable of lasing has a first laser chip with a first center wavelength and is effectively wavelength locked by a first injected spectrally-sliced narrow-band light signal; and
   a second light source capable of lasing to couple at a second output end of the demultiplexer, wherein the second light source capable of lasing has a second laser chip with a second center wavelength that is different from the first center wavelength that decreases the operating range of each of the first light source and the second light source, wherein the second light source is effectively wavelength locked by a second injected spectrally-sliced narrow-band light signal.

45. The multi-channel passive optical network wavelength division multiplexing system of claim 44, wherein the bandwidth of the wavelength locking range of the first light source capable of lasing and the bandwidth of the wavelength locking range of the second light source capable of lasing combine to be equal or greater than the sum of the operating range of the system bandwidth, the variation in the center wavelength due manufacturing tolerances, and an offset in a gain curve due to temperature changes.

46. The multi-channel passive optical network wavelength division multiplexing system of claim 44, further comprising a current pump to bias a first light source capable of lasing to operate as a reflective regenerative semiconductor optical amplifier.

47. The multi-channel passive optical network wavelength division multiplexing system of claim 44, wherein the first injected narrow-band light signal into the first light source capable of lasing suppresses the lasing of the Fabry-Perot modes outside of the bandwidth of the first injected narrow-band light signal.

48. The multi-channel passive optical network wavelength division multiplexing system of claim 44, wherein the Fabry-Perot modes outside of the bandwidth of the first injected narrow-band light signal incur a side mode suppression ratio of three decibels or more.

49. The apparatus of claim 1, wherein the effectively wavelength locking the output wavelength of the light source capable of lasing within the bandwidth of the injected light signal comprises regeneratively amplifying the injected light signal.

50. The apparatus of claim 26, wherein the effectively wavelength the output wavelength of the light source capable of lasing within the bandwidth of the injected light signal comprises regeneratively amplifying the injected light signal.

51. The apparatus of claim 44, wherein the effectively wavelength locking the first light source capable of lasing by the first injected spectrally-sliced narrow-band light signal comprises regeneretively amplifying the injected spectrally-sliced narrow-band light signal.

* * * * *